(12) United States Patent
Minamikawa et al.

(10) Patent No.: US 10,747,855 B2
(45) Date of Patent: Aug. 18, 2020

(54) CONTENT GENERATING DEVICE, CONTENT INSPECTING DEVICE, CONTENT GENERATING METHOD, AND COMPUTER-READABLE MEDIUM INCLUDING CONTENT DATA STRUCTURE

(71) Applicant: TOPPAN PRINTING CO., LTD., Taito-ku (JP)

(72) Inventors: Haruka Minamikawa, Taito-ku (JP); Toshio Oka, Taito-ku (JP); Ryoji Akimoto, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 168 days.

(21) Appl. No.: 15/470,103

(22) Filed: Mar. 27, 2017

(65) Prior Publication Data

US 2017/0199993 A1 Jul. 13, 2017

Related U.S. Application Data

(63) Continuation of application No. PCT/JP2015/072936, filed on Aug. 13, 2015.

(30) Foreign Application Priority Data

Sep. 26, 2014 (JP) ................................. 2014-197116

(51) Int. Cl.
*H04L 9/00* (2006.01)
*G06F 21/16* (2013.01)
(Continued)

(52) U.S. Cl.
CPC ............ *G06F 21/16* (2013.01); *H04L 9/0643* (2013.01); *H04L 9/3239* (2013.01);
(Continued)

(58) Field of Classification Search
CPC .. G06F 21/16; G06F 21/10; G06F 2221/0737; G06F 2221/0733;
(Continued)

(56) References Cited

U.S. PATENT DOCUMENTS

| 2005/0256836 A1 | 11/2005 | Awamoto et al. |
| 2006/0080538 A1 | 4/2006 | Kusuda et al. |
| 2015/0036871 A1* | 2/2015 | Feng ...................... G06F 21/16 382/100 |

FOREIGN PATENT DOCUMENTS

| CN | 102194205 A | 9/2011 |
| JP | 2005-327154 A | 11/2005 |

(Continued)

OTHER PUBLICATIONS

International Search Report dated Nov. 17, 2015 in PCT/JP2015/072936, filed Aug. 13, 2015.

(Continued)

*Primary Examiner* — Alexander Lagor
(74) *Attorney, Agent, or Firm* — Oblon, McClelland, Maier & Neustadt, L.L.P.

(57) ABSTRACT

A watermarked content generating device including processing circuitry which performs active element conversion that converts a specified active modification target element from among elements included in an original content, based on a modification control code that is generated based on embedded information, when generating a structured content including at least a structured document, and performs passive element conversion that converts a specified passive modification target element from among elements included in the original content such that a change in a perceptual aspect of the original content corresponding to an active modification result element which results from the active (Continued)

element conversion is returned to having a same or equivalent perceptual aspect as that of the original content.

17 Claims, 9 Drawing Sheets

(51) Int. Cl.
    *H04L 9/06*     (2006.01)
    *H04L 9/32*     (2006.01)

(52) U.S. Cl.
    CPC .. *G06F 2221/0737* (2013.01); *H04L 2209/16* (2013.01); *H04L 2209/608* (2013.01)

(58) Field of Classification Search
    CPC ......... H04L 2463/101; H04L 2209/608; H04L 2209/603
    See application file for complete search history.

(56) References Cited

FOREIGN PATENT DOCUMENTS

| | | |
|---|---|---|
| JP | 2006-109249 A | 4/2006 |
| JP | 2008-219875 A | 9/2008 |
| JP | 2010-282327 A | 12/2010 |

OTHER PUBLICATIONS

Office Action dated Aug. 5, 2019 in corresponding Chinese Patent Application No. 201580050564.9 with English Translation.

* cited by examiner

CONTENT GENERATING DEVICE, CONTENT INSPECTING DEVICE, CONTENT GENERATING METHOD, AND COMPUTER-READABLE MEDIUM INCLUDING CONTENT DATA STRUCTURE

CROSS-REFERENCE TO RELATED APPLICATIONS

The present application is a continuation of International Application No. PCT/JP2015/072936, filed Aug. 13, 2015, which is based upon and claims the benefits of priority to Japanese Application No. 2014-197116, filed Sep. 26, 2014. The entire contents of these applications are incorporated herein by reference.

BACKGROUND OF THE INVENTION

Field of the Invention

The present invention relates to a content generating device, a content inspecting device, a content generating method, and a computer-readable medium that includes a content data structure.

Discussion of the Background

It is possible to copy digital content without losing information. Moreover, actions such as improper distribution of personally copied content to a third party can be easily performed without cost by using the Internet or the like.

For example, technology for preventing improper use of content such as described above is called Digital Rights Management (DRM). As mainstream DRM technology, there is a technique by which a content provider encrypts content, and a user that has received a proper decryption key from the provider decodes and uses the content. However, in this kind of encryption technology, special software is necessary for decoding the content, so the browsing environment for browsing content is limited and versatility is low.

There is known DRM technology called digital watermarking. Digital watermarking is technology in which information about specified content (for example, the author's name, billing information, number of allowed copies, and the like) is embedded in the content. By embedding digital watermarking information in the content in this way, improper copying, improper distribution of content and the like are restrained.

For example, by including information in a digital watermark that indicates users who have properly received the distribution of content, it is possible to track users who have performed improper distribution by checking the digitally watermarked content when content is improperly distributed.

As one form of embedding information in content as a digital watermark, a digital watermark is embedded so that it is difficult for a user to perceive that a digital watermark has been embedded when content is reproduced.

Data such as audio, images (still images), video and the like have a high degree of redundancy. When part of such data is modified to have information embedded as a digital watermark, the data will have much more information expressing the content than the amount of information that a person perceives. Therefore, it is relatively easy to prevent the user from perceiving the information embedded as a digital watermark when the user reproduces the content, and in this regard, impairment of the intention of the content creator is less likely to occur.

On the other hand, when the content is document data such as an e-book, the content has a low degree of redundancy. In other words, for document data, the amount of information about the data is small as compared to the amount of data that a person can perceive. Therefore, when a digital watermark is embedded in the data itself, the perceptual change due to the effect of the embedded information is more noticeable, and the possibility of compromising the intentions of the content creator is high.

With respect to structured documents in, for example, XML format or HTML format, there is technology which specifies a manipulation detection range using a tag, and stores an encryption key, verification data, signature data, etc. as digital watermark information using a tag, in layering the specified manipulation detection range (for example, see Japanese Patent Application Publication No. JP-A-2008-219875).

With this kind of technology, it is difficult for perceptual changes caused by the effect of embedded information to occur. However, in the technology described above, information that is embedded as a digital watermark is clearly defined by a tag that defines the document structure of a structured document as being digital watermark information. Therefore, there is a possibility that a user can easily perform an improper action such as identifying a location where information is embedded as a digital watermark, and removing the digital watermark from that identified location.

SUMMARY OF THE INVENTION

According to an aspect of the present invention, a watermarked content generating device includes processing circuitry which performs active element conversion that converts a specified active modification target element from among elements included in an original content, based on a modification control code that is generated based on embedded information, when generating a structured content including at least a structured document, and performs passive element conversion that converts a specified passive modification target element from among elements included in the original content such that a change in a perceptual aspect of the original content corresponding to an active modification result element which results from the active element conversion is returned to having a same or equivalent perceptual aspect as that of the original content.

According to another aspect of the present invention, a device for inspecting whether a target content under inspection is a content generated by a watermarked content generating device including processing circuitry which performs active element conversion that converts a specified active modification target element from among elements included in an original content, based on a modification control code that is generated based on embedded information, when generating a structured content including at least a structured document, and performs passive element conversion that converts a specified passive modification target element from among elements included in the original content such that a change in a perceptual aspect of the original content corresponding to an active modification result element which results from the active element conversion is returned to having a same or equivalent perceptual aspect as that of the original content, includes second processing circuitry which identifies a passive modification result element or an active modification result element, based on resemblance to the specified active modification target element or the specified passive modification target element of the original content, and restores embedded information based on the identified passive modification result element or the identified active modification result element.

According to still another aspect of the present invention, a method of generating watermarked content includes executing active element conversion, by processing circuitry, that converts a specified active modification target element from among elements included in an original content, based on a modification control code that is generated based on embedded information, when generating a structured content including at least a structured document, and executing passive element conversion, by the processing circuitry, that converts a specified passive modification target element from among elements included in the original content such that a change in a perceptual aspect of the original content corresponding to an active modification result element which results from the active element conversion is returned to having a same or equivalent perceptual aspect as that of the original content.

According to yet another aspect of the present invention, a non-transitory computer-readable medium including computer executable instructions, wherein the instructions, when executed by a computer, cause the computer to perform a method of generating watermarked content, including executing active element conversion, by processing circuitry, that converts a specified active modification target element from among elements included in an original content, based on a modification control code that is generated based on embedded information, when generating a structured content including at least a structured document, and executing passive element conversion, by the processing circuitry, that converts a specified passive modification target element from among elements included in the original content such that a change in a perceptual aspect of the original content corresponding to an active modification result element which results from the active element conversion is returned to having a same or equivalent perceptual aspect as that of the original content.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
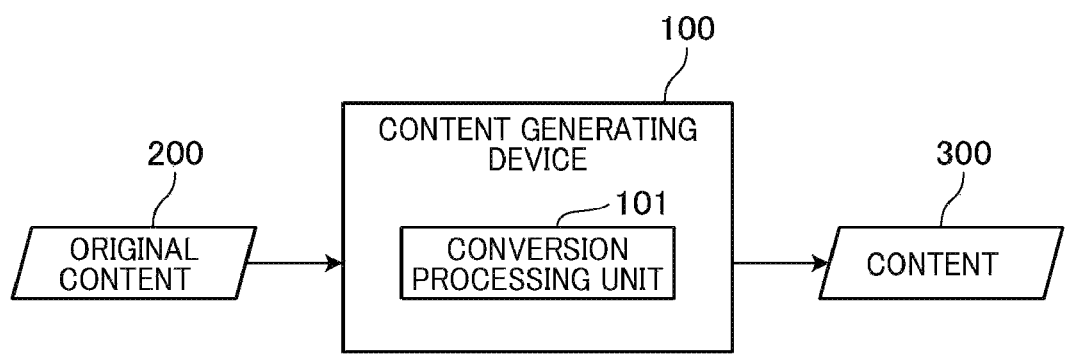
FIG. 1 illustrates an example of configuration of a content generating device in a first embodiment.

The embodiments will now be described with reference to the accompanying drawings, wherein like reference numerals designate corresponding or identical elements throughout the various drawings.

In the following, a content generating device and content inspecting device according to one embodiment of the present invention will be explained with reference to the drawings.

First Embodiment

FIG. 1 illustrates an example of the configuration of a content generating device 100 as a first embodiment. The content generating device 100 that is illustrated in FIG. 1 includes a conversion processing unit 101.

When creating content, the conversion processing unit 101 performs active element conversion and passive element conversion.

Active element conversion is processing that, based on modification control codes that were generated based on embedded information, converts specified elements of the elements included in original content that are active modification target elements.

Active modification target elements after conversion by active element conversion are called active modification result elements. Active element conversion is defined as individual conversion that is performed for one active modification target element.

Passive element conversion is processing that converts specified elements of the elements included in original content that are passive modification target elements so that the change in the perceptual aspect from the original content that was given by active modification result elements is returned to the same state as when the original content was reproduced.

Passive modification target elements after conversion by passive element conversion are called passive modification result elements. Passive element conversion is defined as individual conversion that is performed for one passive modification target element.

Moreover, in this embodiment, embedded information that will become the generating source of modification control codes is the information that is to be embedded in the content. In this embodiment, embedded information includes as embedding target data user identification information that can identify a user that is a proper distribution destination of created content.

Here, a user that is identified by user identification information could be a user other than an individual, and could also be a group such as an organization.

Moreover, the user identification information could be information that, even though not able to identify a user by itself, could, in combination with other information, make it possible to identify a user. For example, a user identifier or the like itself is not able to directly identify a user by expressing just a numerical value as an identifier; however, by combining that user identifier with user information such as a user name that is correlated with the user identifier, it becomes possible to identify a user.

Embedding target data that is included in the embedded information is not limited, and it is possible to also include information other than user identification information; however, in the explanation below, an example is explained in which the embedding target data includes user identification information. This kind of embedded information that includes user identification information as the embedding target data functions, for example, as information for Digital Rights Management (DRM).

In the following explanation, the following terms will be defined as described below.

A set of "active element conversions" will be called an "active element conversion set". Moreover, a set of "passive element conversions" will be called a "passive element conversion set".

When "active element conversion" and "passive element conversion" are not particularly distinguished, conversion will simply be called "element conversion".

Moreover, when "active modification target elements" and "passive modification target elements" are not particularly distinguished, the elements will simply be called "modification target elements".

Moreover, conversion that contributes to the overall content by active element conversion being performed on each of the active modification target elements is called "active content conversion".

Conversion that contributes to the overall content by passive element conversion being performed on each of the passive modification target elements is called "passive content conversion".

When "active content conversion" and "passive content conversion" are not particularly distinguished, conversion will simply be called "content conversion".

Furthermore, conversion that is a combination of "active content conversion" and "passive content conversion" is called "comprehensive conversion".

The content generating device 100 outputs the original content 200 for which comprehensive conversion was performed as content 300. The content 300 can be distributed, for example, by way of a network or the like.

Figure 2:
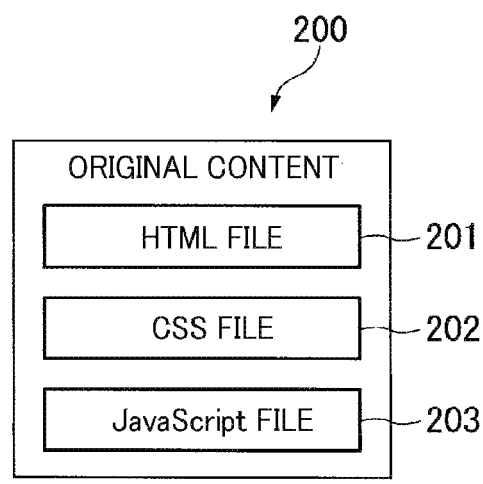
FIG. 2 illustrates an example of original content in a first embodiment.

FIG. 2 illustrates an example of configuration of original content 200 in this embodiment. The original content 200 in this embodiment have an HTML file 201, a CSS file 202 and a JavaScript file 203.

The HTML file 201 is a document file that is written in a markup language as the HTML (HyperText Markup Language). The HTML file 201 is a file that includes a text document and information that defines the document structure. Defining the document structure of an HTML file 201 is performed by attaching tags to the elements (nodes) of the document. A document for which the document structure has been defined as in the case of an HTML file 201 is called a structured document.

A structured document that is included in the original content 200 is not limited to being an HTML file 201, and can also be a file that is written in another markup language such as XML (Extensible Markup Language), SGML (Standard Generalized Markup Language) or the like.

The CSS file 202 is information that specifies the decoration for elements that are defined by the HTML file 201 (one example of extended control information, decoration specification information). More specifically, the CSS file 202 is written according to CSS (Cascading Style Sheets), which is one kind of style sheet that controls the display format for a structured document or the like.

Decoration specification information is not limited to the CSS file 202 and other kinds of style sheets may be used.

The JavaScript file 203 is information that gives a dynamic function to reproduction of an HTML file (one example of extended control information, dynamic functioning information). The JavaScript file 203 is a program file that is written in JavaScript (registered trademark).

A static state is expressed by the HTML file 201. In addition, by including a JavaScript file 203 as in the original content 200 of this embodiment, it is possible to give a dynamic function such as movement or interactivity to the form of the content obtained by reproducing the HTML file 201.

Dynamic functioning information could also be a program file other than a JavaScript file 203.

Moreover, it is not illustrated in figures, however, it is sufficient that the original content 200 that is the target of comprehensive conversion by the conversion processing unit 101 of the content generating device of this embodiment be stored in a storage device that is included in the content generating device 100, or in an external storage device that is connected to the content generating device 100. The conversion processing unit 101 should acquire the original content 200 that is stored in these storage devices.

Next, an example of a form of comprehensive conversion of original content 200 by the conversion processing unit 101 of this embodiment will be explained with reference to FIG. 3.

Figure 3:
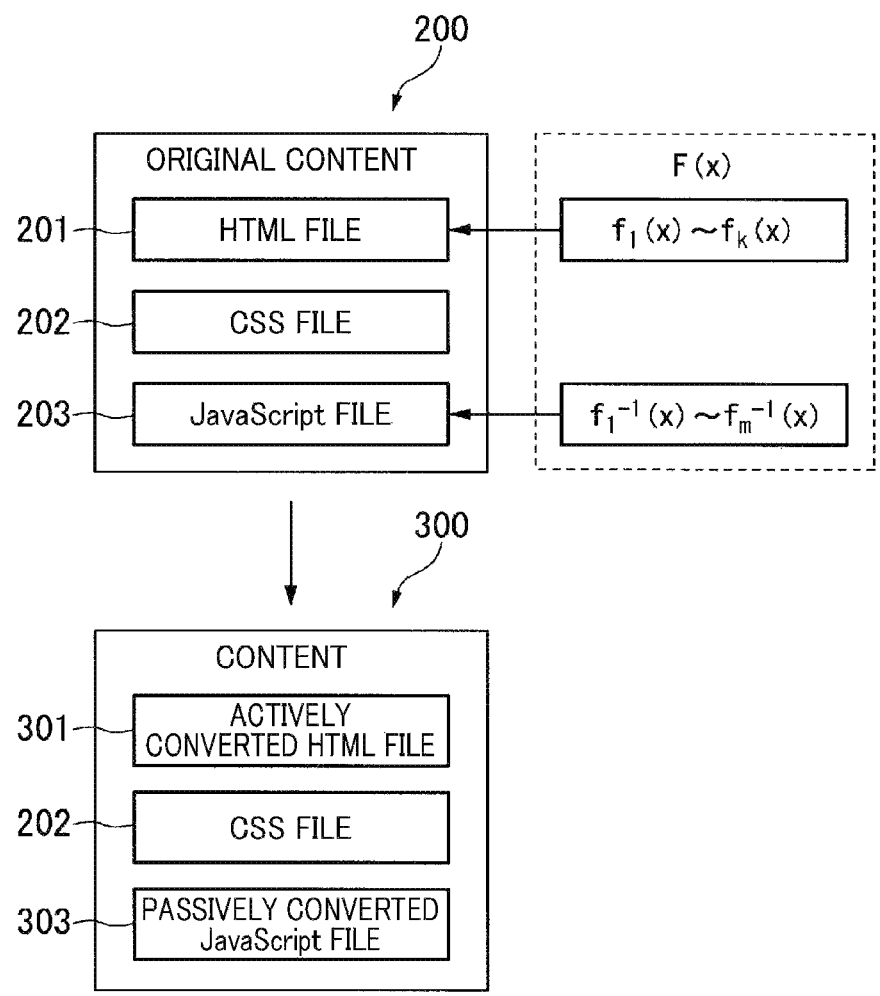
FIG. 3 illustrates an example of a form of overall conversion by a content generating device in a first embodiment.

In FIG. 3, comprehensive conversion of the original content 200 by the conversion processing unit 101 of this embodiment is indicated as F(x).

As active content conversion in the comprehensive conversion (F(x)) illustrated in FIG. 3, the conversion processing unit 101 performs conversion of each of the first through kth active modification target elements ($N_1$ to $N_k$) in the HTML file 201 based on the first through kth modification control codes ($D_1$ to $D_k$). From these active element conversions, active content conversion ($f_1(x)$ to $f_k(x)$) is performed for the entire content.

Moreover, as the passive content conversion in the comprehensive conversion (F(x)), the conversion processing unit 101 performs conversion ($f_1^{-1}(x)$ to $f_m^{-1}(x)$) of each of the first through mth passive modification target elements ($P_1$ to $P_m$) in the JavaScript file 203 so that the change in the visual aspect from the original content 200 that was given by the active content conversion ($f_1(x)$ to $f_k(x)$) above is returned to the same state as the original content 200.

The comprehensive conversion described above, as process F, can be expressed as one or more composite maps such as in Equation 1 below (Equation 1 is for the case when k=m). The asterisk in Equation 1 expresses a composite map.

Active content conversion and passive content conversion do not need to alternate or be the same number as in Equation 1. As long as comprehensive conversion of content (process F of Equation 1) is an identity mapping of the perceptual aspect, there is no need for restrictions of the order or number, such as alternating the order or having the same number. For example, the perceptual aspect by plural active content conversions can be offset with a different number of passive content conversions. An example of a case in which there is not a 1-on-1 relationship of the active content conversion and passive content conversion is given in Equation 2.

In the example of Equation 2, active content conversion by $f_1$ and $f_2$ is offset by passive content conversion by $g_1$. Similarly, active content conversion by $f_3$, is offset by $g_2$ and $g_3$, and active content conversion by $f_k$ is offset by $g_m$.

In the following, in order to simplify the explanation, the case in which $g_i = f_i^{-1}$ and k and m are the same number will be described, however, as long as the comprehensive conversion is an identity mapping of the perceptual aspect, the method of combining active content conversion and passive content conversion is arbitrary. In the following, the portion that is $f_i^{-1}$ can be put into a more general format by replacing $f_i^{-1}$ with $g_j$.

Equation 1

$$F = f_1^{-1} * f_1 * f_2^{-1} * f_2 * \ldots f_k^{-1} * f_k \quad \text{(Equation 1)}$$

Equation 2

$$F = (g_1 * f_1 * f_2) * (g_2 * g_3 * f_3) * \ldots * (g_m * f_k) \quad \text{(Equation 2)}$$

As a result of performing comprehensive conversion as described above, the content 300 illustrated in FIG. 3 is generated. The content 300 include an actively converted HTML file 301, a CSS file 202 and a passively converted JavaScript file 303.

The actively converted HTML file 302 is an HTML file for which active content conversion was performed. The passively converted JavaScript file 303 is a JavaScript file for which passive content conversion was performed. The CSS file 202 is a file that is obtained without performing content conversion, and has the same content as the CSS file of the original content 200.

An example of the procedure when performing active content conversion of an HTML file 201 such as in the example in FIG. 3 will be explained with reference to FIG. 4.

First, the conversion processing unit 101 performs encoding $S_1$ for embedded information $Dt_1$, and generates a primary code string $Dt_2$.

The embedded information $Dt_1$, as described above, is information that is to be embedded in an HTML file 201, and includes user identification information that indicates a user that is a proper distribution destination of generated content. The user identification information can be a user identifier, for example, that uniquely identifies a user that is a proper distribution destination of generated content. In FIG. 4, a character string "ABCD" is illustrated as embedded information $Dt_1$, however, this can also express that the embedded information $Dt_1$ can be a character string and that the detailed character string of the embedded information $Dt_1$ is arbitrary.

Next, the conversion processing unit 101 performs error-correction encoding $S_2$ of the primary code string $Dt_2$, and generates a secondary code string $Dt_3$.

Then, the conversion processing unit 101 obtains plural divided data $Dt_{4-1}$ to $Dt_{4-5}$ by performing a dividing process $S_3$ on the secondary code string $Dt_3$. In this example, the divided data $Dt_{4-1}$ to $Dt_{4-5}$ that were obtained by dividing the secondary code string $Dt_3$ by the dividing process $S_3$ are the modification control codes ($D_1$ to $D_5$), respectively.

When the divided data $Dt_{4-1}$ to $Dt_{4-5}$ are not particularly distinguished, the divided data are indicated as $Dt_4$. Moreover, as in the case illustrated in FIG. 4, the case in which the secondary code string $Dt_3$ is divided into five divided data $Dt_{4-1}$ to $Dt_{4-5}$ corresponds to an example of a case in which five active modification target elements ($N_1$ to $N_5$) are set in the HTML file 201.

Figure 4:
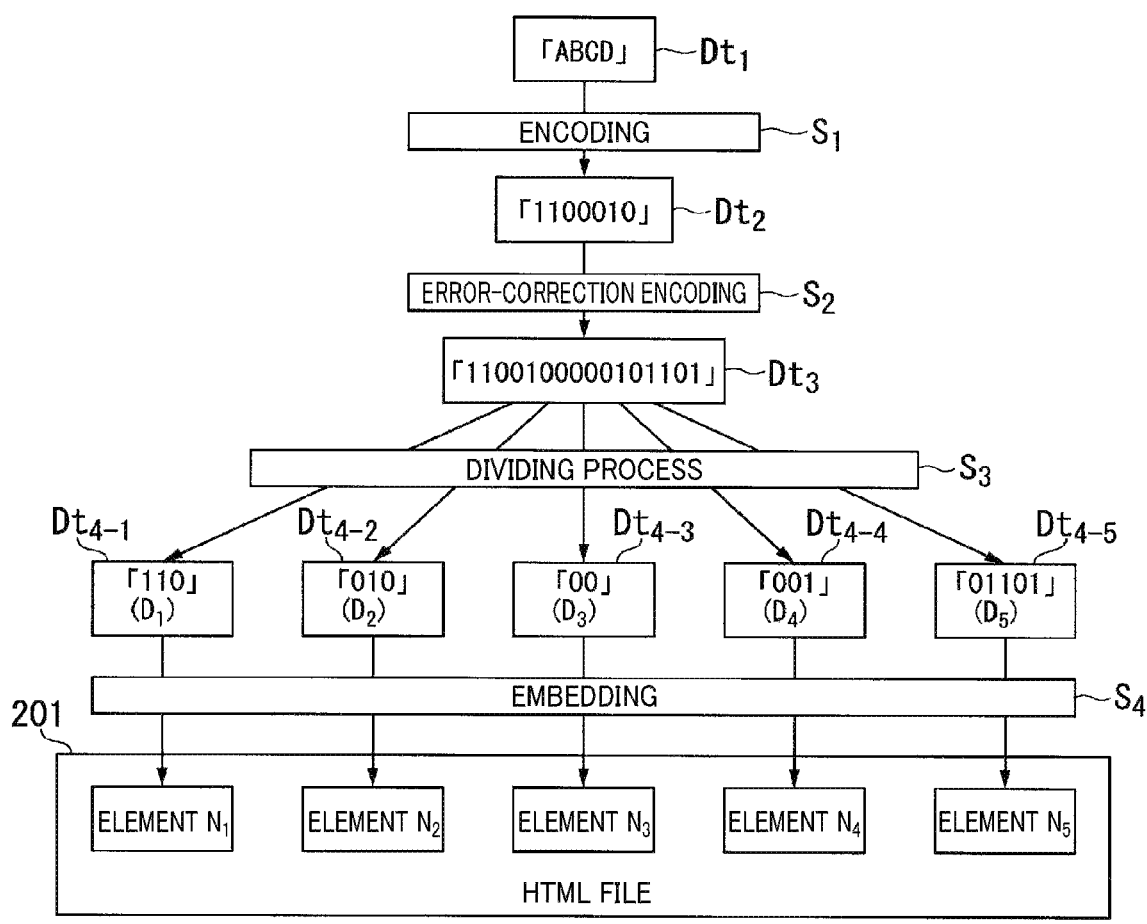
FIG. 4 illustrates a procedure for active content conversion by a content generating device in a first embodiment.

As can be seen from the example in FIG. 4, each of the modification control codes ($D_1$ to $D_5$) as divided data $Dt_{4-1}$ to $Dt_{4-5}$ do not need to have the same number of bits (data length) as illustrated in the figure.

Next, the conversion processing unit 101 embeds the modification control codes ($D_1$ to $D_5$) that were obtained as divided data $Dt_{4-1}$ to $Dt_{4-5}$ in each of the respective elements (active modification target elements) $N_1$ to $N_5$ of the HTML file 201.

Here, various forms are possible as the form for embedding divided data $Dt_4$ as modification control codes in the corresponding active modification target elements, however, as one example, a form such as described below can be employed.

First, for the active modification target elements of the HTML file 201, a selection such as described below can be made. For example, of the characters written as sentences between a tag <p> to a tag </p> that define a paragraph in the HTML file 201, the conversion processing unit 101 selects the first to the fifth characters every specified number of characters starting from the start as active modification target elements.

Then, the conversion processing unit 101 performs modification of each of the code points of the first to fifth characters (active modification target elements) based on each of the respective modification codes ($D_1$ to $D_5$). In this way, an actively converted HTML file 301 embedded with embedded information $Dt_1$ is obtained.

The conversion processing unit 101 may also perform processing for including check digits in the embedded information $Dt_1$.

The conversion processing unit 101 can include check digits in the embedded information $Dt_1$ in the following way, for example. Here, an example is given in which the user identification information is the character string "ABCD", and a secret character string that is assigned to the user that is identified by the character string "ABCD" is "8QtZ2p".

The conversion processing unit 101 in this case obtains the character string "ABCD8QtZ2p" by connecting "8QtZ2p" to the character string "ABCD".

In addition, the conversion processing unit 101 calculates a hash value from performing a cryptographic hash function (for example, SHA-512) on the character string "ABCD8QtZ2p". Then, the conversion processing unit 101 adds the hash value that was obtained by this calculation to the character string "ABCD". In this way, the embedded information $Dt_1$ becomes the information obtained by adding the hash value to the character string "ABCD".

Moreover, when generating modification control codes from the embedded information $Dt_1$, it is possible to omit at least one of the error-correction encoding process $S_2$ and dividing process $S_3$. When the dividing process $S_3$ is not performed, only one modification control code is generated from the embedded information $Dt_1$. In that case, when there are plural active modification target elements, active element conversion is performed on each of the plural active modification target elements using the same one modification control code.

Passive content conversion of the JavaScript file 203 is performed as described below, for example, depending on the active content conversion that was performed as described above.

The conversion processing unit 101 performs passive element conversion on each of the passive modification target elements $P_1$ to $P_m$ that correspond to the active modification target elements that were the target of conversion by active content conversion. When doing this, the passive modification target elements $P_1$ to $P_m$ are converted so that the change in the visual aspect from the original content by the actively converted HTML file 301 is cancelled, or in other words so that control is performed making the code points of each of the first to fifth characters (active modification result elements) above the same as in the original content 200. In this way, a passively converted JavaScript file 303 is obtained.

In the explanation above, an example was given in which the number of active modification target elements and the number of passive modification target elements were the same (k=m). However, the number of active modification target elements and the number of passive modification target elements are not limited to being the same.

When a content reproduction device (for example, a web browser or the like) reproduces the content 300 that were obtained by performing comprehensive conversion such as described above, first a form such as described below is obtained by reproducing the actively converted HTML file 301.

In other words, each of the first through fifth characters (active modification result elements) that are displayed by reproducing the actively converted HTML file 301 become different characters than when the HTML file 201 is reproduced.

In addition, the content reproduction device executes the passively converted JavaScript file 303 on the actively converted HTML file 301 that was displayed as described above. In doing so, the code points of the first through fifth characters above (active modification result elements) are modified so as to become the same as the active modification target elements that were included in the HTML file 201 of the original content 200. As a result, the characters that correspond to the first through fifth elements are displayed and are the same as the characters that were displayed when the original content 200 was reproduced.

By reproducing the content 300 in this way, the actively converted HTML file 301 gives a change in the visual aspect that is different from that of the original content 200. In addition, the passively converted JavaScript 303 applies a modification so that the change in the visual aspect from the original content 200 by the actively converted HTML file 301 returns to a state that is equivalent to when the original content 200 was reproduced.

As a result, the content 300 undergo visual modification in two stages by the actively converted HTML file 301 and the passively converted JavaScript file 303. The displayed content is the same as the original content 200.

An example of another form of comprehensive conversion in which the HTML file 201 and JavaScript file 203 of the original content 200 are the target will be explained with reference to FIG. 5.

Figure 5:
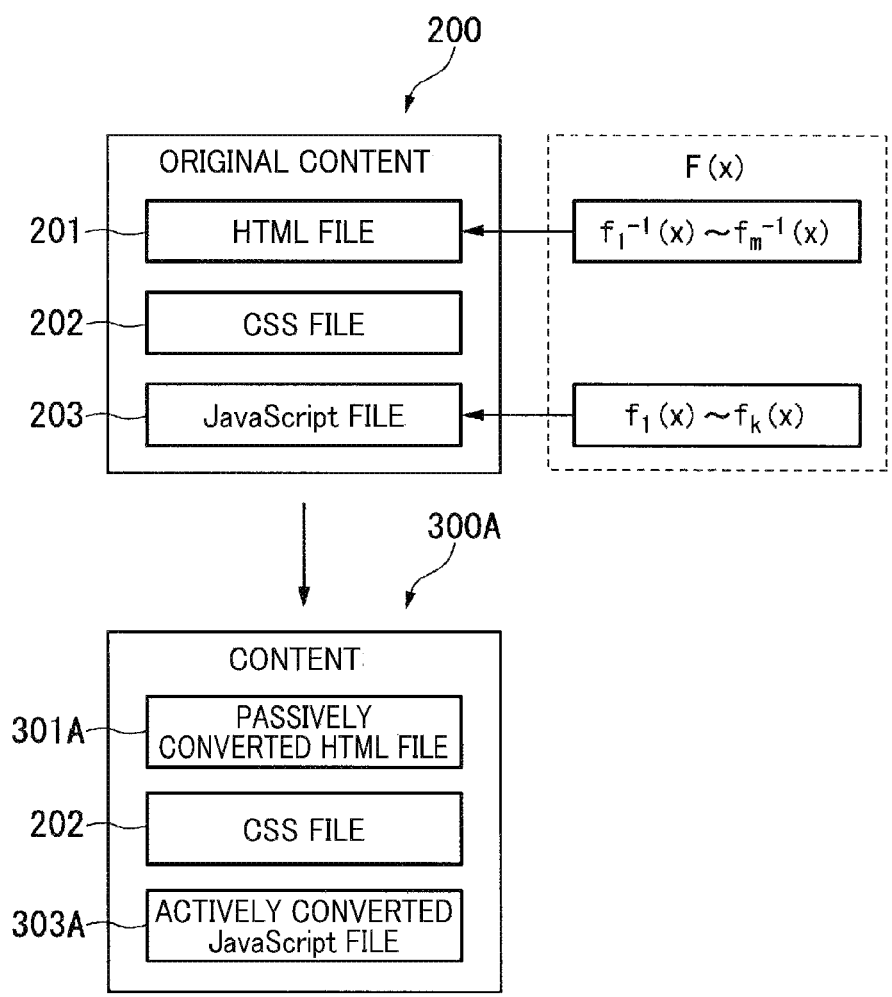
FIG. 5 illustrates an example of another form of overall conversion by a content generating device in a first embodiment.

In other words, the comprehensive conversion (F(x)) illustrated in FIG. 5, opposite from the case illustrated in FIG. 3, is conversion in which active content conversion ($f_1(x)$ to $f_k(x)$) is performed on the JavaScript file 203 and passive content conversion ($f_1^{-1}(x)$ to $f_m^{-1}(x)$) is performed on the HTML file 201 of the original content 200.

That is, as can be seen in FIG. 5 and FIG. 3, a file that is the target of active content conversion and a file that is the target of passive content conversion can be interchanged.

Then, when reproduction is performed on the content 300A that is generated as illustrated in FIG. 5, executing the actively converted JavaScript file 303A gives a change to the visual aspect of the reproduced passively converted HTML file 301A. However, passive content conversion is performed for the passively converted HTML file 301A. Therefore, the change in the visual aspect that is given by the actively converted JavaScript file 303A is returned by reproducing the passively converted HTML file 301A itself. As a result, even when the content 300A in FIG. 5 are reproduced, a display having the same visual aspect as that of the original content is performed.

Next, an example of another form of comprehensive conversion of this embodiment will be explained.

Figure 6A:
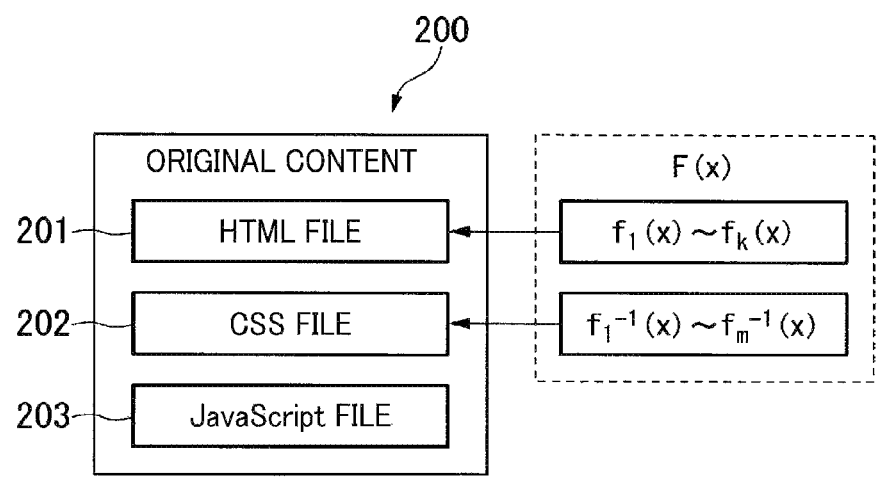
FIG. 6A illustrates an example of another form of overall conversion by a content generating device in a first embodiment.
Figure 6B:
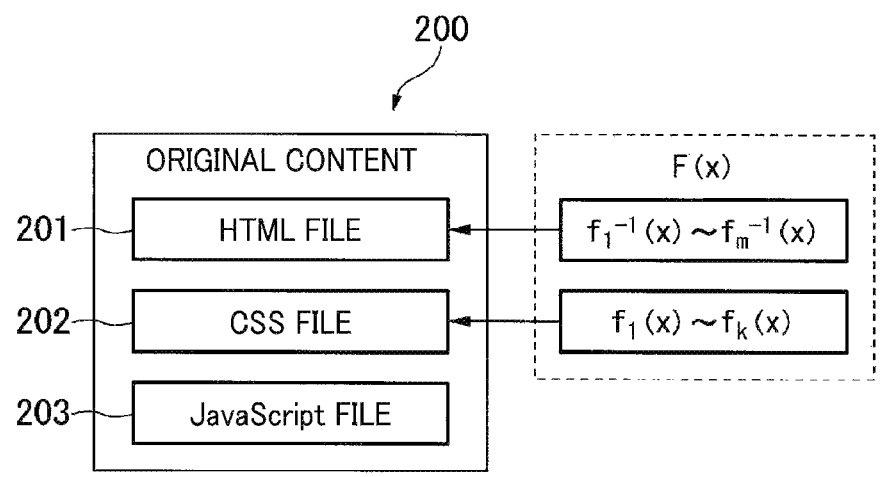
FIG. 6B illustrates an example of another form of overall conversion by a content generating device in a first embodiment.

FIG. 6A is an example in which active content conversion is performed on the HTML file 201 and passive content conversion is performed on the CSS file 202 as the comprehensive conversion (F(x)). FIG. 6B, opposite that of FIG. 6A, is an example in which passive content conversion is performed on the HTML file 201 and active content conversion is performed on the CSS file 202 as comprehensive conversion (F(x)).

Figure 7A:
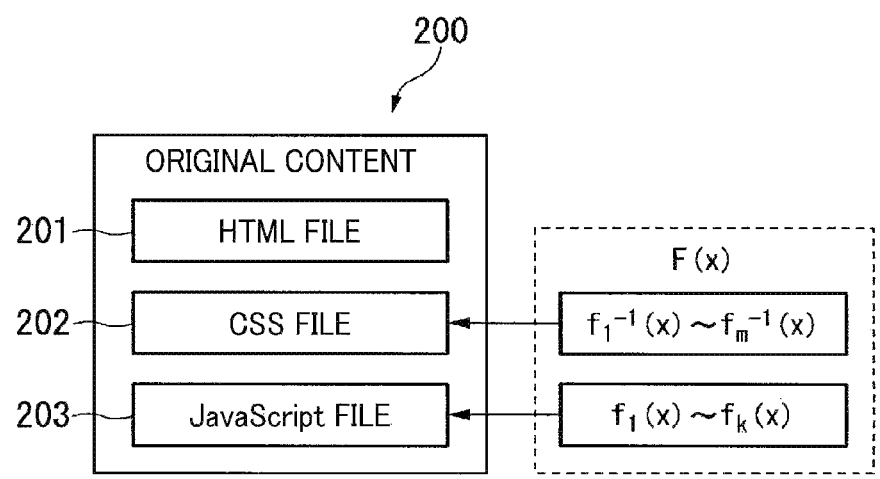
FIG. 7A illustrates an example of another form of overall conversion by a content generating device in a first embodiment.

FIG. 7A is an example in which active content conversion is performed on the JavaScript file 203 and passive content conversion is performed on the CSS file 202 as the comprehensive conversion (F(x)).

Figure 7B:
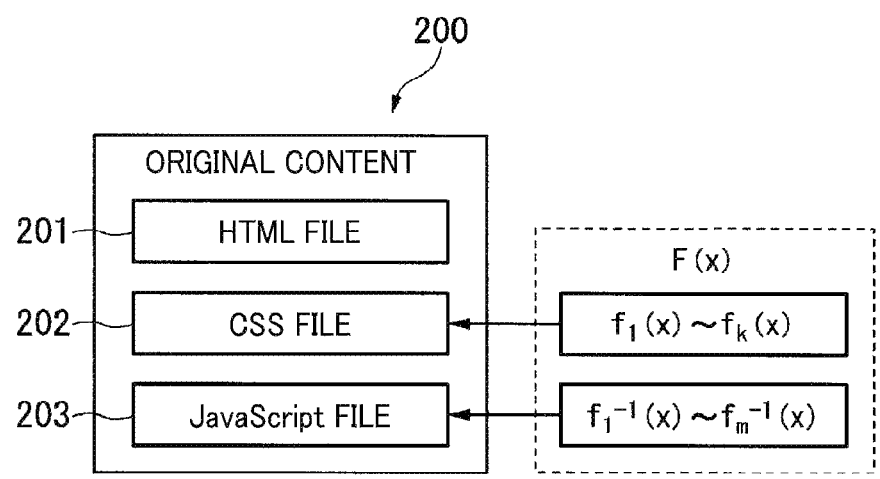
FIG. 7B illustrates an example of another form of overall conversion by a content generating device in a first embodiment.

FIG. 7B, opposite that of FIG. 7A, is an example in which passive content conversion is performed on the JavaScript file 203 and active content conversion is performed on the CSS file 202 as comprehensive conversion (F(x)).

Here, the examples of comprehensive conversion (F(x)) that are illustrated in FIG. 3 and FIG. 5 to FIG. 7B are such that active content conversion and passive content conversion are respectively performed on different files of the original content 200.

Figure 8:
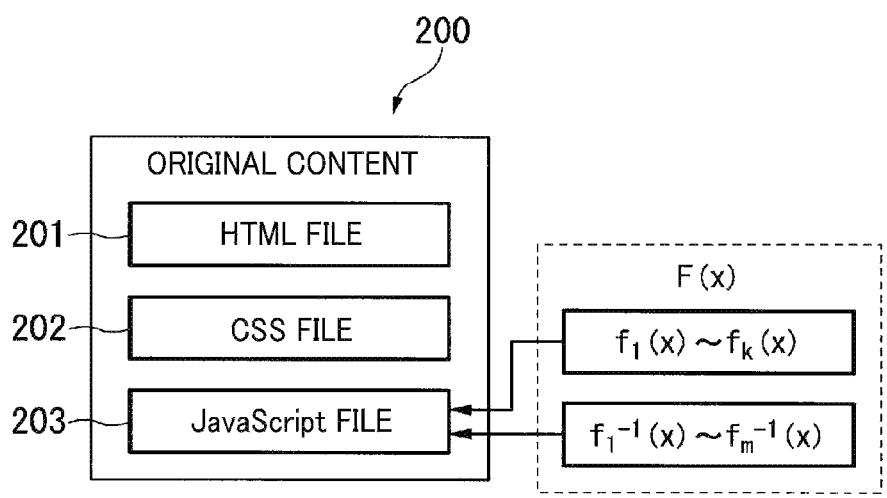
FIG. 8 illustrates an example of another form of overall conversion by a content generating device in a first embodiment.

However, FIG. 8 is an example in which active content conversion and passive content conversion are performed on the same JavaScript file 203 as comprehensive conversion (F(x)).

In this way, the comprehensive conversion of this embodiment can be such that active content conversion and passive content conversion are performed on the same one file of the original content 200.

When performing active content conversion and passive content conversion with the same one file of the original content 200 as the target such as described above, the target file is not limited to being the JavaScript file 203. In other words, the target file on which active content conversion and passive content conversion are performed could be the HTML file 201, or could be the CSS file 202.

In addition, when active content conversion and passive content conversion are performed on the HTML file 201, the content 300 of this embodiment can be configured so as to have at least one HTML file 301.

Moreover, an explanation is omitted in the figures, however, in active content conversion, the active element conversions of an active element conversion set do not all need to be performed on the same one file, and can be divided and performed on more than one file.

For example, of the k ($k=k_1+k_2+k_3$) number of active element conversions in an active element conversion set, the specified active element conversion of $k_1$ can be performed on the HTML file 201, the specified active element conversion of $k_2$ can be performed on the CSS file 202 and the specified active element conversion of $k_3$ can be performed on the JavaScript file 203.

The same is true for the m ($m=m_1+m_2+m_3$) number of passive element conversions in a passive element conversion set.

In the explanation in FIG. 4, an example is illustrated in which the modification control codes and the active modification target elements are in a one-to-one relationship, however, they do not necessarily need to be in a one-to-one relationship. As one example, it is possible to perform active element conversion using the same one modification control code for each of plural different active modification target elements.

Furthermore, it is also possible to perform different comprehensive conversion for each user to which content is distributed. Various patterns for making the comprehensive conversion different for each user are possible.

As one example, it is possible to make the active modification target elements and the corresponding passive modification target elements different for each user.

For example, when modifying code points as in the case of the example in FIG. 3, for a certain user, of the characters written in a sentence between tag <p> and a tag </p> that define a paragraph in an HTML file 201, characters every fifth character from the start are selected as active modification target elements. However, for another user, characters every tenth character from the start are selected as active modification target elements. In this way, the selection of active modification target elements differs, so the selection of passive modification target elements also will be different for each user.

Moreover, when the active modification target elements and the passive modification target elements are made to differ for each user as described above, the number of active modification target elements and passive modification target elements can also be made to differ for each user.

Moreover, the file for which active content conversion is performed, and the file for which passive content conversion is performed can be different for each user.

Furthermore, files in which the elements that are targets of conversion by all of the active element conversions in an active element conversion set can be different for each user.

In the explanation up to this point, examples were given in which the control target of the visual aspect by active element conversion and passive element conversion was code points of objects as characters, or in other words, characters, however, the control target is not limited to these.

For example, it is also possible to control the character spacing of objects as the same character by active element conversion and passive element conversion.

As a detailed example when performing active element conversion on an HTML file when controlling the character spacing, the value of letter-spacing in the class attribute of a box should be changed in the <div id="box1" class="box"> tag based on a modification control code according to the <style> tag. Moreover, as passive element conversion that corresponds to the active element conversion above, letter-spacing: normal should be written in id="box1" for the CSS file, for example.

When element conversion is performed as described above, by reproducing the HTML file, for example, character spacing according to the modified value of the letter-spacing is applied to characters that will be arranged corresponding to box1. However, in the CSS file, by writing letter-spacing: normal in the same box1, character spacing according to the value of letter-spacing of the HTML file above is cancelled, and the character spacing is returned to normal. In other words, characters that correspond to element conversion obtained by reproducing content have the same visual aspect as the original content.

The control target for the visual aspect by element conversion could also be the object color. The control target for the visual aspect by element conversion could also be the object size. The control target for the visual aspect by element conversion could also be the object shape. The control target for the visual aspect by element conversion could also be the object arrangement (layout).

In addition, the control target for the visual aspect by plural active content conversions and passive content conversions of one comprehensive conversion can be appropriately selected, for example, from among the characters, character spacing, object color, object size, object shape, object arrangement and the like described above. In other words, the control target for the visual aspect by each set of plural sets of active element conversion and passive element conversion of one comprehensive conversion can be different for each set.

Moreover, the object that is the control target for the visual aspect is not limited to a character, and could be, for example, the background, frame and the like.

As can be understood from the explanation up to this point, the content 300 that was generated by the content generating device 100 of this embodiment was obtained by performing active content conversion and passive content conversion of the original content 200. As a result, the content 300 has a data structure that includes active modification result elements and passive modification result elements that were respectively converted from the active modification target elements and passive modification target elements of the original content 200.

In addition, embedded information $Dt_1$ is embedded in the content 300 by passive content conversion as was previously explained using FIG. 4.

When an information processing device (computer) that is operated by a web browser or the like reproduces the content 300, the information processing device uses the active modification result elements and passive modification result elements that are included in the content 300 as will be explained below. In other words, the information processing device uses the active modification result elements to apply a specified change to the perceptual aspect when the content 300 was reproduced that is different than that when the original content 200 was reproduced. However, the information processing device uses the passive modification result elements to return the change in the perceptual aspect that was applied using the active modification result elements to the same state as when the original content 200 was reproduced.

The visual aspect that is obtained by the content 300 being reproduced in this way is effectively the same as that of the original content 200. However, a typical digital watermark or the like is, for example, copyright protection information that is embedded in content using a visual aspect that is different than that of the original content.

When compared with the technique of this kind of digital watermark, the content 300 of this embodiment has the same visual aspect as that of the original content 200 even though copyright protection information is embedded as embedded information Dt1, and therefore do not lose the intention of the content creator.

Moreover, by content 300 of this embodiment being reproduced with the same visual aspect as that of the original content 200, it is difficult for a malicious user to notice that copyright protection information using embedded information $Dt_1$, for example, has been embedded. Furthermore, even though a user is aware that embedded information $Dt_1$ is embedded, there is no perceptual difference from the original content 200, so it is difficult to identify how the embedded information $Dt_1$ is embedded in the content 300.

In addition, the conversion processing unit 101 of the content generating device 100 of this embodiment, as was explained above, can generate content 300 by differing the details of comprehensive conversion according to each user that is a distribution destination of the content. The content 300 that is generated in this way are then distributed to each user.

As a result, it becomes further difficult to find regularity in the comprehensive conversion, and thus it becomes further difficult to identify what the embedded information $Dt_1$ is like.

As was described above, the embedded information $Dt_1$ that is embedded in the content 300 of this embodiment include user identification information, which is information that is unique for each user that is a distribution destination of the content 300. By user identification information being embedded in the content 300 in this way, it is possible to identify a user to which content is improperly distributed as will be described below.

Figure 10:
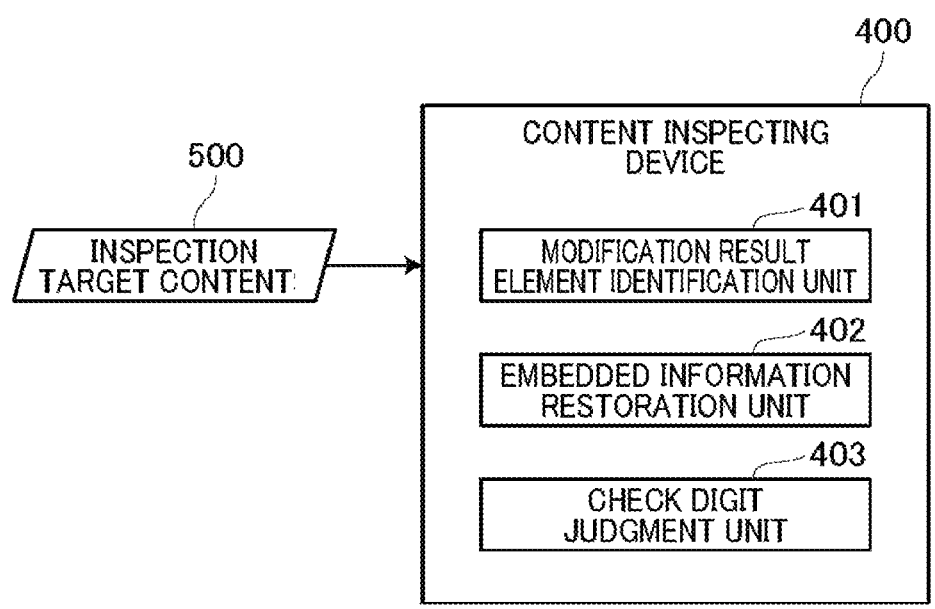
FIG. 10 illustrates an example of configuration of a content inspecting device in a first embodiment.

FIG. 10 illustrates an example of the configuration of a content inspecting device of this embodiment. The content inspecting device 400 includes a modification result element identification unit 401, an embedded information restoration unit 402 and a check digit judgment unit 403.

The modification result element identification unit 401 identifies modification result elements (passive modification result elements or active modification result elements) from inspection target content 500 based on the resemblance to the active modification target elements or passive modification target elements in the original content.

The embedded information restoration unit 402 restores the embedded information based on the identification results of modification result elements by the modification result element identification unit 401.

The check digit judgment unit 403 determines whether or not a check digit that is included in the embedded information matches a hash value (one example of a calculated value) that is calculated using the user identification information (one example of embedding target data) that is included in embedded information that was restored by the embedded information restoration unit 402.

As can be understood from the configuration described above, the content inspecting device 400, as the inspection of content that was improperly distributed, restores embedded information $Dt_1$ that is embedded in the content.

A detailed example of restoring embedded information $Dt_1$ will be explained using the content illustrated in FIG. 4 as an example. The modification result element identification unit 401 first performs identification of the modification result elements (active modification result elements or passive modification result elements) in an HTML file that will be the target of inspection. In order for this, the modification result element identification unit 401 analyzes the syntax of each of the content of the original content that will be the target of inspection, and extracts elements (modification result element candidates) that resemble (or match) the modification target elements of the original content from the inspection target content.

Extraction of modification result elements based on resemblance can be performed as described below for example. In other words, the modification result element identification unit 401 acquires the syntax analysis results as a tree structure, and follows the similar elements one layer at a time from the root elements of the tree structure to the child elements. Then the modification result element identification unit 401 in the process of following the similar elements, extracts elements of the inspection target content that corresponds to the modification target elements of the original content as modification result elements.

Here, there is a possibility that a user that attempts to improperly distribute content will have applied a change such as a modification, addition, deletion or the like of elements in the structure of the content that is the target of inspection in order to make it difficult to restore the embedded information $Dt_1$. Taking this into consideration, when the modification result element identification unit 401 is extracting modification result elements, it is not absolutely necessary to use elements that completely match as target elements.

For example, as the modification result element identification unit 401 follows the similar elements one layer at a time from the root elements to the child elements, when a resemblance that is equal to or greater than a specified threshold value is obtained, the elements that are obtained that correspond to the modification target elements of the original content may be extracted as modification result elements.

As a detailed example, in the case of an HTML file, an entry <div style="background-color:#123456"> and an entry <div style="background-color:#123457" have a resemblance that is equal to or greater than a threshold value. Moreover, a <div> tag and a <span> tag that have a similar function can also be regarded as having a high degree of resemblance.

Modification result elements can be identified by modification result elements being extracted in this way.

Based on the identification results of the modification result elements described above, the embedded information restoration unit 402 extracts divided data $Dt_{4-1}$ to $Dt_{4-5}$ as embedded modification control codes for each of the first to fifth elements $N_1$ to $N_5$ of the HTML file.

The embedded information restoration unit 402 can extract divided data $Dt_{4-1}$ to $Dt_{4-5}$ based on the difference of each of the first to fifth elements of the HTML file 201 of the original content 200 with respect to each of the first to fifth elements of the actively converted HTML file 301 of the content 300.

The embedded information restoration unit 402 generates a secondary code string $Dt_3$ by connecting the extracted divided data $Dt_{4-1}$ to $Dt_{4-5}$, and then generates a primary code string $Dt_2$ by performing error correction that uses an error-correction code that is added to the secondary code string $Dt_3$. Then, the embedded information restoration unit 402 generates embedded information $Dt_1$ by performing decoding of the primary code string $Dt_2$. In this way, the embedded information restoration unit 402 can restore the embedded information $Dt_1$ from improperly distributed content.

The embedded information restoration unit 402 can acquire user identification information by acquiring embedded information $Dt_1$ that was restored in this way.

A monitor that monitors improper distribution of content keeps a user identification information database in which user identification information is stored for each user to which content has been properly distributed up until the present. Therefore, the monitor can identify a user to which content is improperly distributed by comparing user identification information that was acquired by the content inspecting device 400 with the user identification information database.

The user identification information database described above may be stored in the content inspection device 400. Then, the content inspection device 400 can identify a user to which content is improperly distributed by comparing user identification information that was acquired by the content inspection device 400 from the inspection target content that was improperly distributed with the user identification information database.

Moreover, the content inspection device 400, after acquiring user identification information, can also further perform verification (judgment) of whether or not the acquired user identification information was really embedded in the content generated by the content generating device 100.

When restoration is performed of embedded information as the target of different content that was not generated from the original content when acquiring user identification information (restoring embedded information $Dt_1$) by the method described above, there is a possibility that the restored embedded information will accidentally match the embedded information of the content that was generated from the original content.

In order to eliminate the possibility that embedded information (user identification information) will accidentally match, adding a check digit to the embedded information when converting content is effective. Then, by performing verification that uses the check digit that was added to the embedded information when the content inspecting device 400 restores the embedded information, it is possible to determine whether or not the embedded content is really the information that was embedded in the original content and not different content. In other words, it is possible to determine whether or not the acquired user identification information is really the information that was embedded in the content that was generated by the content generating device 100.

The content inspecting device 400 can perform verification that uses a check digit as described below, for example.

As was described above, a check digit is a hash value that is calculated and obtained by using a character string ("ABCD8QtZ2p") that is obtained by connecting a secret character string such as "8QtZ2p" to a character string such as "ABCD" that is used as user identification information, and is added to a character string of user identification information.

Therefore, the content inspecting device 400 calculates a hash value by using the user identification information that was obtained from the content that is the target of inspection. Then, the content inspecting device 400 determines whether or not the calculated hash value matches the check digit that is included in the embedded information that was acquired from the content that is the target of inspection.

When the hash value and the check digit match, it is determined that the acquired user identification information is really the information that was embedded in the content that was generated by the content generating device 100.

However, when the hash value and the check digit do not match, it is determined that the acquired user identification information is not really the information that was embedded in the content that was generated by the content generating device 100.

In a cryptographic hash function, the probability that output will collide with different input can be virtually ignored. Therefore, for content that is not generated by an information embedding device, it can be considered that matching of a hash value that is calculated by the content inspecting device 400 and a check digit that is acquired from content that is the target of inspection will virtually not occur.

As described above, the content inspection device 400 can identify a user that has properly received distributed content. In this case, when a user that is identified as described above tries to improperly redistribute content that was properly distributed to and received by the user, that user can be caught. In other words, by identifying a user that properly received distributed content, it becomes possible to identify a user that improperly distributes content.

In this way, content 300 in which embedded information $Dt_1$ has been embedded has a copyright protection function that makes it possible to identify a user that performed improper distribution.

Moreover, as was explained using FIG. 4, the modification control code of this embodiment can be generated by way of error-correction encoding S2. In other words, in this embodiment, active element conversion can be performed based on modification control codes that were generated based on error-correction encoded embedded information $Dt_3$.

For example, when a malicious user improperly distributes content 300, there is a possibility that the active modification result elements in the content 300 has been tampered with. However, by performing active element conversion based on the error-correction encoded embedded information $Dt_3$ as described above, the possibility of being able to properly restore the embedded information $Dt_1$ by error correction increases even when the active modification result elements have been tampered with.

Next, an example of the processing procedure that is executed by the content generating device 100 will be explained with reference to the flowchart in FIG. 9. The process illustrated in FIG. 9 corresponds to an example such as was explained in FIG. 3 and FIG. 4 in which as the comprehensive conversion, active content conversion is performed on the HTML file 201 and passive content conversion is performed on the JavaScript file 203.

In the content generating device 100, the conversion processing unit 101 inputs embedded information $Dt_1$ (step S101).

Next, the conversion processing unit 101 uses the embedded information $Dt_1$ that was inputted in step S101 and generates modification control codes $D_1$ to $D_k$ that correspond to the respective ith active modification target elements $N_1$ ($1 \leq i \leq k$) in the HTML file 201 (step S102).

In the example that was explained above using FIG. 4, the modification control codes $D_1$ to $D_k$ are divided data $Dt_{4-1}$ to $Dt_{4-5}$, and are obtained by the conversion processing unit 101 executing encoding $S_1$, error-correction encoding $S_2$ and a dividing process $S_3$ as was explained using FIG. 4.

Next, the conversion processing unit 101 substitutes 1 for the variable i as the initial value (step S103).

Subsequently, the conversion processing unit 101 performs processing after that for active content conversion f(x) with the HTML file 201 as a target.

In order for that, the conversion processing unit 101 performs active element conversion using a modification control code $D_i$ on an active modification target element $N_i$ of the HTML file 201 (step S104). After active element conversion is performed in step S104, the conversion processing unit 101 increments the variable i (step S105), and then determines whether or not the variable i is larger than the maximum value k (step S106).

When the variable i is k or less (step S106: NO), all of the active element conversion is not yet completed.

Therefore, in this case the conversion processing unit 101 returns to the processing in step S104, and performs active element conversion on the next active modification element target $N_i$ in the HTML file 201.

Then, after completing active element conversion for all of the active modification target elements $N_1$ to $N_k$, the conversion processing unit 101 determines that the variable i is greater than k (step S106: YES). In this case, the conversion processing unit 101 moves to the processing described below for passive content conversion with the JavaScript file 203 as a target.

Next, the conversion processing unit 101 substitutes 1 for the variable j as the initial value (step S107).

Subsequently, the conversion processing unit 101 performs passive element conversion on a passive modification target element $P_j$ in the JavaScript file 203 (step S108).

After passive element conversion of the passive modification target element $P_3$ has been performed in step S108, the conversion processing unit 101 increments the variable j (step S109), and determines whether or not variable j is greater than the maximum value m (step S110).

When the variable j is m or less (step S110: NO), all of the passive element conversion is not yet completed.

Therefore, in this case the conversion processing unit 101 returns to the processing in step S108, and performs passive element conversion on the next passive modification element target $P_j$ in the JavaScript file 203.

Then, after completing passive element conversion for all of the passive modification target elements $P_1$ to $P_m$, the conversion processing unit 101 determines that the variable j is greater than m (step S110: YES), and the processing illustrated in FIG. 9 ends.

By performing active content conversion and passive content conversion (comprehensive conversion) in this way, content 300 that includes the actively converted HTML file 301, passively converted JavaScript file 303 and the CSS file 202 is generated as illustrated in the example in FIG. 3, for example.

Figure 9:
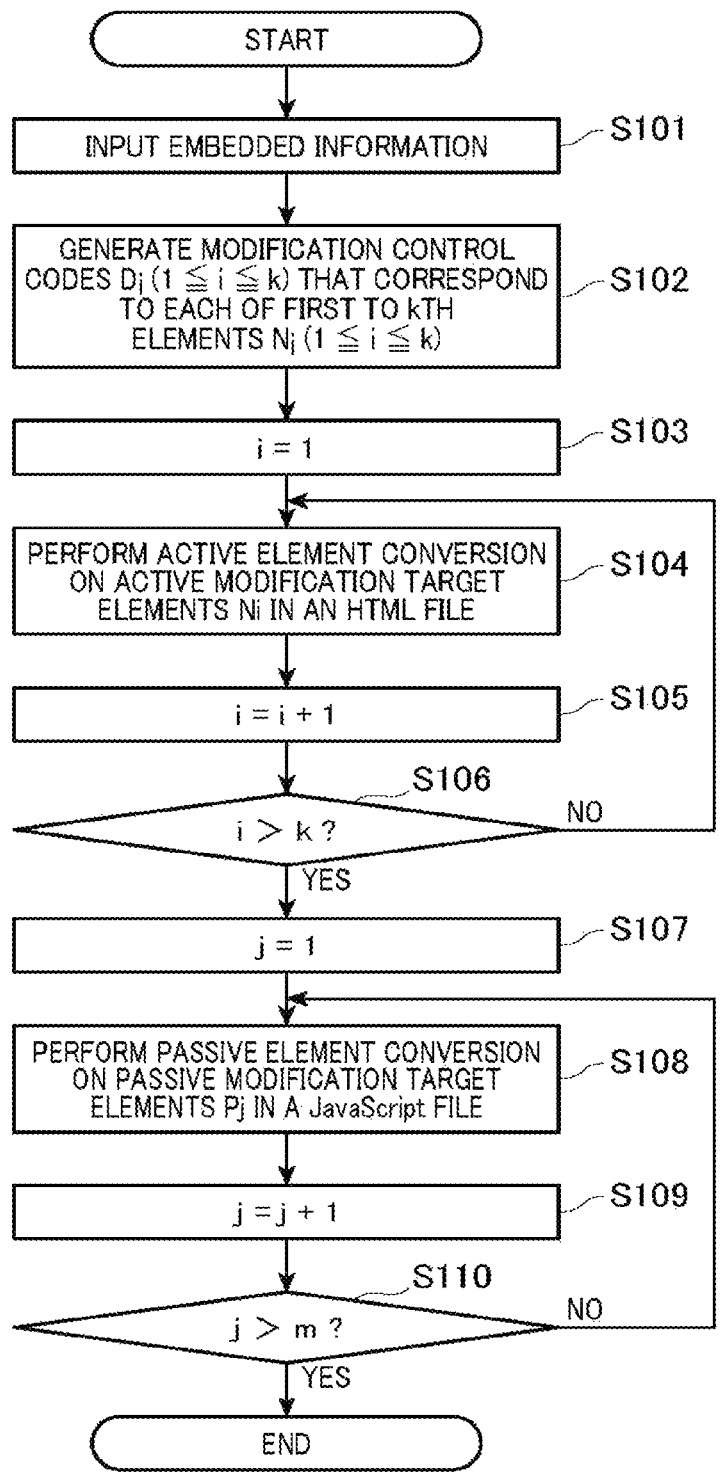
FIG. 9 is a flowchart that illustrates an example of a processing procedure that is executed by a content generating device in a first embodiment.

In the processing procedure illustrated in FIG. 9, active content conversion (steps S101 to S106) is executed first, and then passive content conversion (steps S107 to S110) is executed next. However, the processing procedure can also be such that passive content conversion is executed first, and active content conversion is executed next.

Moreover, the processing procedure can be such that active element conversion is executed on the ith active modification target element N and passive element conversion is executed on the jth passive modification target element $P_3$ successively for each combination of ith active modification target element $N_i$ and jth passive modification target element $P_j$. In this case as well, the order of active element conversion and passive element conversion can be such that active element conversion is first and passive element conversion is later, or so that passive element conversion is first and active element conversion is later.

Second Embodiment

Figure 11:
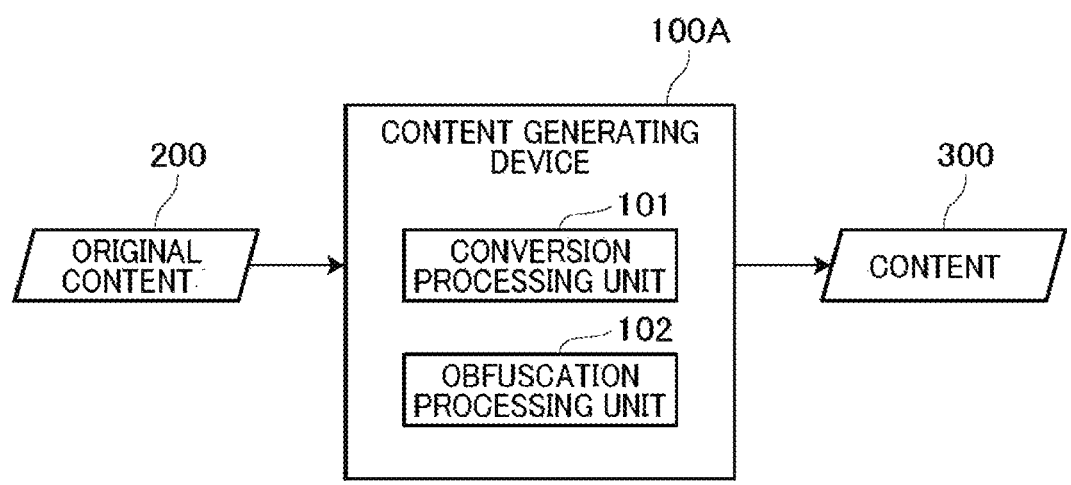
FIG. 11 illustrates an example of configuration of a content generating device in a second embodiment.

Next, a second embodiment will be explained. FIG. 11 illustrates an example of configuration of a content generating device 100A of this second embodiment. In FIG. 11, the same reference numbers are used for parts that are the same as those in FIG. 1, and here, mainly the points that are different from FIG. 1 will be explained.

The content generating device 100A illustrated in FIG. 11 further includes an obfuscation processing unit 102 in addition to the conversion processing unit 101. The obfuscation processing unit 102 is able to make part or all of the content 300 obscure. In obfuscating the content 300, generally, obfuscation is performed on the script portion (JavaScript file), however, in the case that the obfuscation does not have an effect on the visual effect, obfuscation can be performed on a style sheet (CSS file) or structured document (HTML file).

More specifically, when obfuscation is performed on the JavaScript file, the obfuscation processing unit 102 may input a JavaScript file that has undergone at least one of active element conversion and passive element conversion, and perform processing for obfuscating the inputted JavaScript file.

The algorithm used for obfuscation is not particularly limited, and it is possible, for example, to apply an existing algorithm.

In the example described above, the obfuscation process is performed by the obfuscation processing unit 102 on a target file that has undergone active element conversion or passive element conversion. However, opposite from the procedure described above, it is also possible to perform active element conversion or passive element conversion on a file that has undergone obfuscation processing by the obfuscation processing unit 102.

By being able to obfuscate the content in this way, it becomes difficult for a malicious user, for example, to identify by reverse engineering or the like a location in the content where embedded information has been embedded.

Moreover, in the explanation up until this point, change in the visual aspect was applied as element conversion (active element conversion, passive element conversion) of the content. However, it is also possible to apply change to the auditory aspect or the like as comprehensive conversion of content. For example, when content having structured documents are reproduced such that audio can be reproduced, it is possible to apply auditory change by performing conversion of audio data based on modification control codes.

In other words, the element conversion (active element conversion, passive element conversion) in this embodiment may apply change to the perceptual aspect, which includes the visual aspect and auditory aspect of the content.

It is also not absolutely necessary for passive element conversion to completely return change in the perceptual aspect that was applied by the corresponding active element conversion to the original form. In other words, as the passive element conversion, it is possible to return the change in the perceptual aspect that was applied by active element conversion to an extent that, even though not completely returned to the original form, for example, the change is not humanly perceivable.

Furthermore, there is a possibility that unintended delay will occur due to the active element conversion or passive element conversion, and that some unexpected change will occur in the perceptual aspect due to that delay, however, that change can be ignored.

The content generating device (100, 100A) and the content inspecting device 400 of the monitoring system can be separate devices, or could be configured as one device that has a content generating function and a content inspection function.

By recording programs for achieving the functions of the content generating device (100, 100A) and content inspecting device 400 on a computer-readable recording medium, and causing a computer system to read and execute the programs that are recorded on that recording medium, that computer system can perform processing as a content generating device (100, 100A) and content inspecting device 400. Here, "causing a computer system to read and execute the programs that are recorded on that recording medium" includes installing the program on the computer system. The "computer system" referred to here is presumed to include an OS and hardware such as peripheral devices.

The "computer system" can also include plural computer devices that are connected by way of a network such as the Internet, a WAN or LAN, or network that that includes communication lines such as dedicated lines and the like.

Moreover, the "computer-readable recording medium" is a storage device such as a portable medium like a flexible disk, a magneto-optical disc, ROM, CD-ROM, and the like, or a hard disc or the like that is installed inside the computer system. In this way, the recording medium that stores the programs can also be a non-transitory recording medium such as a CD-ROM or the like.

Moreover, the recording medium also includes a recording medium that is internally or externally provided and that can be accessed from the distribution server in order to distribute the programs. The program code of the programs that are stored on the recording medium of the distribution server may have a different program code format than a format that is executable by a terminal device. In other words, it does not matter what format the programs stored on the distribution server are in as long as the programs can be downloaded from the distribution server and installed in a format that is executable by a terminal device. Configuration is also possible in which a program is divided into plural programs, and combined in the terminal device after each program is downloaded at different timing, and the distribution servers that distribute the divided programs can also be different.

Furthermore, "the computer readable recording medium" is presumed to also include a recording medium that temporarily stores a program such as volatile memory (RAM) inside a computer system that is a server or client when programs are transmitted via a network. The programs can also be for achieving part of the functions described above. Moreover, the functions described above can be achieved by combining programs that are already recorded in the computer system, and can be a so-called differential file (differential program).

An aspect of the present invention is to provide a content generating device, a content inspecting device, a content generating method and a computer-readable medium that includes a data structure that are able to make it difficult to identify a location where information is embedded while at the same time suppressing perceptual change in content due to embedded information when information is embedded in content having structured documents.

A first form of the present invention is a content generating device that includes a conversion processing unit that performs: active element conversion for converting specified active modification target elements from among elements included in original content based on modification control codes that are generated based on embedded information when generating structured content having at least a structured document; and passive element conversion for converting specified passive modification target elements from among elements included in the original content so that change in a perceptual form from the original content that is applied by active modification result elements that were converted from the active modification target elements by the active element conversion is returned to a state equivalent to when the original content is reproduced.

A second form of the present invention is the content generating device of the first form, wherein the content includes one or more items of expansion control information that expands the perceptual form when the structured document is reproduced; and the conversion processing unit executes the active element conversion with one or more of the structured document and the one or more items of expansion control information as a target, and executes the passive element conversion with elements that are included in one or more of the structured document and the one or more items of expansion control information as a target.

A third form of the present invention is the content generating device of the second form, wherein the content includes as the expansion control information at least one of decoration specification information that specifies decoration for the structured document, and dynamic functioning information that provides a dynamic function to the reproduction of the structured document.

A fourth form of the present invention is the content generating device of any one of the first to the third forms, wherein the conversion processing unit executes the active element conversion based on the modification control codes that were generated based on error-correction encoded embedded information.

A fifth form of the present invention is the content generating device of any one of the first to the fourth forms, wherein the conversion processing unit generates embedded information that includes embedding target data and a check digit that is calculated based on the embedding target data.

A sixth form of the present invention is the content generating device of any one of the first to the fifth forms, and further includes an obfuscation processing unit that is able to perform obfuscation on part or all of the content.

A seventh form of the present invention is the content generating device of any one of the first to the sixth forms, wherein the conversion processing unit performs the active element conversion and the passive element conversion so that a set of active element conversions and a set of passive element conversions are different for each user that is a distribution destination of content.

An eighth form of the present invention is the content generating device of any one of the first to the seventh forms, wherein the conversion processing unit may convert at least one of characters, character spacing, object color, object size, object shape, and object arrangement as the active element conversion or the passive element conversion.

A ninth form of the present invention is a content inspecting device that inspects whether or not inspection target content is content that was generated by a content generating device of any one of the first to the sixth forms; and includes: a modification result element identification unit that identifies passive modification result elements or active modification result elements from inspection target content based on resemblance to the active modification target elements or passive modification target elements of the original content; and an embedded information restoration unit that restores embedded information based on the identification results for the passive modification result elements or active modification result elements by the modification result element identification unit.

A tenth form of the present invention is the content inspecting device of the ninth form, and may determine whether or not a check digit that is included in the embedded information matches a value that was calculated using embedding target data that is included in embedded information that was restored by the embedded information restoration unit.

An eleventh form of the present invention is a content generating method including the steps of: executing active element conversion by a conversion processing unit for converting specified active modification target elements from among elements included in original content based on modification control codes that are generated based on embedded information when generating structured content having at least a structured document; and executing passive element conversion by the conversion processing unit for converting specified passive modification target elements from among elements included in the original content so that change in a perceptual form from the original content that is applied by active modification result elements that were converted from the active modification target elements by the active element conversion is returned to a state equivalent to when the original content is reproduced.

A twelfth form of the present invention is a computer-readable medium that includes a content data structure, wherein the content, in a structure having at least a structured document, includes active modification result elements that are obtained by converting active modification target elements of the original content based on specified modification control codes, and passive modification result elements that are converted from passive modification target elements in the original content; and the data structure causes a computer to execute: a process of using the active modification result elements to apply specified change so that the perceptual form when the content is reproduced is different than when the original content is reproduced; and a process of using the passive modification result elements to return the change in the perceptual form that was applied by the active modification result elements to a state that is equivalent to that when the original content is reproduced.

With the forms of the present invention described above, it is possible to make identifying locations of embedded information difficult while at the same time suppressing perceptual change in content due to embedded information when embedding information in content having a structured document.

REFERENCE SIGNS LIST 100, 100A: content generating device; 101: conversion processing unit; 102: obfuscation processing unit; 200: original content; 201: HTML file; 202: CSS file; 203: JavaScript file; 300, 300A: content; 301: actively converted HTML file; 301A: passively converted HTML file; 303: passively converted JavaScript file; 303A: actively converted JavaScript file; 400: content inspecting device; 401: modification result element identification unit; 402: embedded information restoration unit; 403: check digit judgment unit; 500: inspection target content; $Dt_1$: embedded information; $Dt_2$: primary code string, Dt3: secondary code string; $Dt_4$: divided data; $S_1$: encoding; $S_2$: error-correction encoding; $S_3$: dividing process; $S_4$: embedding.

Obviously, numerous modifications and variations of the present invention are possible in light of the above teachings. It is therefore to be understood that within the scope of the appended claims, the invention may be practiced otherwise than as specifically described herein.

What is claimed is:

1. A watermarked content generating device, comprising: processing circuitry configured to perform first element conversion that converts a first set of elements included in an original content, based on a modification control code that is generated based on embedded information, when generating a structured content including at least a structured document, such that a change in a perceptual aspect of the original content occurs, and perform, after performing the first element conversion of the first set of elements, second element conversion that converts a second set of elements included in the original content, such that the change in the perceptual aspect of the original content which results from the first element conversion of the first set of elements is returned to having a same or equivalent perceptual aspect as that of the original content, wherein the first set of elements and the second set of elements are not identical, the original content includes a structured document and an auxiliary file that expands the perceptual aspect when the original content is reproduced, each element of the first set of elements is in the structured document or the auxiliary file, and each element of the second set of elements is in the structured document or the auxiliary file.

2. The watermarked content generating device of claim 1, wherein the original content includes, in the expansion control information, at least one of decoration style specification information that specifies decoration style for the structured document, and dynamic functioning information that provides a dynamic function to a reproduction of the structured document.

3. The watermarked content generating device of claim 1, wherein the processing circuitry is further configured to perform the first element conversion based on the modification control code that is generated based on the embedded information that includes error-correction encoded embedded information.

4. The watermarked content generating device of claim 2, wherein the processing circuitry is further configured to perform the first element conversion based on the modification control code that is generated based on the embedded information that includes error-correction encoded embedded information.

5. The watermarked content generating device of claim 1, wherein the processing circuitry is further configured to generate embedded information that includes embedding target data and a check digit, and the check digit is calculated based on the embedding target data.

6. The watermarked content generating device of claim 2, wherein the processing circuitry is further configured to generate embedded information that includes embedding target data and a check digit, and the check digit is calculated based on the embedding target data.

7. The watermarked content generating device of claim 1, wherein the processing circuitry is further configured to perform obfuscation on part or all of the structured content.

8. The watermarked content generating device of claim 2, wherein the processing circuitry is further configured to perform obfuscation on part or all of the structured content.

9. The watermarked content generating device of claim 1, wherein the processing circuitry is further configured to perform the first element conversion and perform the second element conversion such that a set of first element conversions and a set of second element conversions are different for each user to which the structured content is to be distributed.

10. The watermarked content generating device of claim 2, wherein the processing circuitry is further configured to perform the first element conversion and perform the second element conversion such that a set of first element conversions and a set of second element conversions are different for each user to which the structured content is to be distributed.

11. The watermarked content generating device of claim 1, wherein the processing circuitry is further configured to convert at least one of a character, character spacing, object color, object size, object shape, and object arrangement in the first element conversion or the second element conversion.

12. A device for inspecting whether a target content under inspection is a content generated by a watermarked content generating device including first processing circuitry configured to perform first element conversion that converts a first set of elements included in an original content, based on a modification control code that is generated based on embedded information, when generating a structured content including at least a structured document, such that a change in a perceptual aspect of the original content occurs, and to perform second element conversion, after performing the first element conversion of the first set of elements, that converts a second set of elements included in the original content, such that the change in the perceptual aspect of the original content which results from the first element conversion of the first set of elements is returned to having a same or equivalent perceptual aspect as that of the original content, wherein the first set of elements and the second set of elements are not identical, the original content includes a structured document and an auxiliary file that expands the perceptual aspect when the original content is reproduced, each element of the first set of elements is in the structured document or the auxiliary file, and each element of the second set of elements is in the structured document or the auxiliary file, the device comprising:
  second processing circuitry configured to
    identify a second modification result element or a first modification result element, based on resemblance to the first set of elements or the second set of elements of the original content, and
    restore embedded information based on the identified second modification result element or the identified first modification result element.

13. The device of claim 12, wherein the second processing circuitry is further configured to determine whether a check digit included in the embedded information matches a value calculated based on embedding target data included in the restored embedded information.

14. A method of generating watermarked content, comprising:
  executing first element conversion, by processing circuitry, that converts a first set of elements included in an original content, based on a modification control code that is generated based on embedded information, when generating a structured content including at least a structured document, such that a change in a perceptual aspect of the original content occurs; and
  executing, after executing the first element conversion of the first set of elements, second element conversion, by the processing circuitry, that converts a second set of elements included in the original content such that the change in the perceptual aspect of the original content which results from the first element conversion of the first set of elements is returned to having a same or equivalent perceptual aspect as that of the original content, wherein
  the first set of elements and the second set of elements are not identical,
  the original content includes a structured document and an auxiliary file that expands the perceptual aspect when the original content is reproduced,
  each element of the first set of elements is in the structured document or the auxiliary file, and
  each element of the second set of elements is in the structured document or the auxiliary file.

15. A non-transitory computer-readable medium including computer executable instructions, wherein the instructions, when executed by a computer, cause the computer to perform a method of generating watermarked content, comprising:
  executing first element conversion, by processing circuitry, that converts a first set of elements included in an original content, based on a modification control code that is generated based on embedded information, when generating a structured content including at least a structured document, such that a change in a perceptual aspect of the original content occurs; and
  executing, after executing the first element conversion of the first set of elements, second element conversion, by the processing circuitry, that converts a second set of elements included in the original content such that the change in the perceptual aspect of the original content which results from the first element conversion of the first set of elements is returned to having a same or equivalent perceptual aspect as that of the original content, wherein
  the first set of elements and the second set of elements are not identical,
  the original content includes a structured document and an auxiliary file that expands the perceptual aspect when the original content is reproduced,
  each element of the first set of elements is in the structured document or the auxiliary file, and
  each element of the second set of elements is in the structured document or the auxiliary file.

16. The watermarked content generating device of claim 1, wherein
  the structured document corresponds to a markup language file, and
  the auxiliary file corresponds to a JavaScript file.

17. The watermarked content generating device of claim 16, wherein
  the original content includes the markup language file, the JavaScript file, and a Cascading Style Sheets (CSS) file,
  the markup language file corresponds to a HyperText Markup Language (HTML) file, an Extensible Markup Language (XML) file, or a Standard Generalized Markup Language (SGML) file.

\* \* \* \* \*